United States Patent
Maegawa et al.

(10) Patent No.: US 6,305,958 B1
(45) Date of Patent: Oct. 23, 2001

(54) CABLE REEL AND ASSEMBLING METHOD THEREOF

(75) Inventors: Akihito Maegawa; Shoichi Sugata, both of Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 09/357,924

(22) Filed: Jul. 21, 1999

(30) Foreign Application Priority Data

Jul. 23, 1998 (JP) .................................................. 10-207508

(51) Int. Cl.⁷ ...................................................... H01R 3/00
(52) U.S. Cl. ................................ 439/164; 439/15; 439/34
(58) Field of Search ................................ 439/164, 34, 15

(56) References Cited

U.S. PATENT DOCUMENTS 3,773,987 * 11/1973 Davis et al. ......................... 191/12.4
5,094,396 * 3/1992 Burke ................................. 242/107.1
5,586,381 12/1996 Schauer et al. .
5,607,316 3/1997 Ishikawa .
5,819,893 * 10/1998 Wagner et al. ...................... 191/12.4

FOREIGN PATENT DOCUMENTS 0444584 9/1991 (EP) .
0758596 2/1997 (EP) .

* cited by examiner

*Primary Examiner*—Paula Bradley
*Assistant Examiner*—Truc Nguyen
(74) *Attorney, Agent, or Firm*—Greenblum & Bernstein, P.L.C.

(57) ABSTRACT

A method of assembling a cable reel for a steering wheel is simplified. The method includes unrolling a flat cable having a first end portion from a coiled reel; fixing a first connector to the first end portion of the flat cable; preparing a rotor having a barrel portion, and a top plate provided with a fixing notch; fitting the first connector into the fixing notch; winding the flat cable around the barrel portion of the rotor up to a given length as the flat cable is being unrolled from the coiled reel; cutting off the flat cable, so as to form a second end portion; fixing a second connector to the second end portion; and mounting the rotor wound with the flat cable into the cylindrical casing in a freely rotatable manner.

4 Claims, 3 Drawing Sheets

CABLE REEL AND ASSEMBLING METHOD THEREOF

BACKGROUND OF THE INVENTION

1. Field of the Invention

The present invention relates to a cable reel, also known as a rotary connector, used in steering systems. The steering system includes a steering wheel installed in vehicles such as automobiles. The invention also relates to a method of assembling such a cable reel, in which the number of assembly steps is reduced.

2. Description of Background Information

In automobiles, a cable reel—or rotary connector—is used for electrically connecting electrical equipment installed on a steering wheel to chassis-side circuits. The mounting of the assembly shall be described with reference to FIGS. 1 and 2. The cable reel 1 is wound with a flat cable, and includes a rotor 5 which is rotatable within a cylindrical casing 2. As shown in FIGS. 1 and 2, the cylindrical casing 2 is fixed onto a combination switch body 3, which in turn is fitted to a steering column 4. On the other hand, there is provided a rotor 5 which rotates with a steering wheel. When the cylindrical casing 2 and the rotor 5 are assembled, they form a cylindrical space in which the cable reel 1 is installed such that the flat cable 6 is wound around the cable reel 1 in the manner of a coiled hairspring. End portions of the flat cable 6 are joined, respectively, to a first connector and a second connector. The first connector is fixed to the cylindrical casing 2, whereas the second connector is fixed to the rotor 5. An electrical cable is joined to each of the connectors 7 and 8 by one of its end portions, the other end portion of the cable being led out from the above assembly. As the rotor 5 rotates clockwise or counterclockwise relative to the steering wheel, the flat cable 6 can be made correspondingly tight or loose in the cylindrical space.

The method of assembling cable reel 1 is shown in FIG. 3. In this figure, a flat cable 6 is unrolled from a coiled reel 10 of flat cable 6, with the unrolled part of the flat cable temporarily set aside in a looped state. After a predetermined length of flat cable 6 is unrolled, the unrolled flat cable 6 is cut off from the rest of the reel 10. Both ends of the temporarily looped length of flat cable 6 are then respectively connected to a first connector 7 and a second connector 8, both of which are already connected to a respective electrical cable w. To connect the flat cable 6 to the first connector 7 and second connector 8, the elongate conductive portion (copper strip) of flat cable 6 is first welded to the core portion of electrical cable w. Then, the welded parts are each held by a connector housing.

In order to connect the flat cable 6 to the connectors 7 and 8, the temporarily looped flat cable 6 has to be straightened out. Then, one end portion of flat cable 6 is joined, e.g. to connector 7, whereas the other end portion is joined to connector 8. After the connector 7 is fitted to a top plate of rotor 5, the flat cable 6 is wound around the axial direction of rotor 5. On the other hand, connector 8, which is joined to the other end portion of flat cable 6, is fixed to a cylindrical casing 2. The rotor 5 is then assembled into the cylindrical casing 2 in a freely rotatable manner, as shown in FIGS. 1 and 2.

According to the known method of assembling a cable reel described above, three assembling steps are required:

1) unrolling a flat cable from a coiled reel and temporarily keeping the unrolled flat cable in a looped state;
2) stretching out the spiraled flat cable and joining a connector to each end thereof, and
3) winding the flat cable around the axial direction of a rotor.

This requires the series of steps including temporarily spiraling, straightening, and winding a flat cable. Such a handling process requires considerable labor and costs.

In view of this state of the art, the present invention intends to simplify the above process steps, reduce production costs, and improve productivity.

SUMMARY OF THE INVENTION

According to one aspect of the invention, there is provided a cable reel including a cylindrical casing having at least an end opening, a rotor mounted into the cylindrical casing in a freely rotatable manner, thereby forming a cylindrical space between the cylindrical casing and the rotor, and a flat cable, wherein the rotor is in the shape of a reel having a barrel portion with two ends, the two ends being provided with a top plate and a bottom plate respectively, each plate diametrically projecting from the barrel portion, the flat cable being wound around the barrel portion of the rotor and contained in the cylindrical space, and the top plate of the rotor being arranged such as to close the end opening of the cylindrical casing when the rotor is mounted into the cylindrical casing.

The present invention also provides a method of assembling the above cable reel, including:

a) unrolling the flat cable having a first end portion from a coiled reel;
b) fixing a first connector to the first end portion of the flat cable;
c) preparing the rotor having the barrel portion, and providing the top plate with a fixing notch;
d) fitting the first connector into the fixing notch;
e) winding the flat cable around the barrel portion of the rotor up to a predetermined length as the flat cable is being unrolled from the coiled reel;
f) cutting off the flat cable, so as to form a second end portion;
h) fixing a second connector to the second end portion; and
I) mounting the rotor wound with the flat cable into the cylindrical casing in a freely rotatable manner.

According to another aspect of the invention, there is also provided a method of assembling a cable reel, the cable reel including a cylindrical casing having at least an end opening, a rotor including a barrel portion, and a top plate diametrically projecting from the barrel portion, thereby substantially forming a T-shaped cross-section, the top plate being adaptable for the end opening, and a flat cable wound around the barrel portion, the method including:

a) unrolling the flat cable having a first end portion from a coiled reel;
b) fixing a first connector to the first end portion of the flat cable;
c) preparing the rotor having the barrel portion, and providing the top plate with a fixing notch;
d) fitting the first connector into the fixing notch;
e) winding the flat cable around the barrel portion of the rotor up to a predetermined length as the flat cable is being unrolled from the coiled reel;
f) cutting off the flat cable, so as to form a second end portion;
g) fixing a second connector to the second end portion; and h) mounting the rotor wound with the flat cable into the cylindrical casing in a freely rotatable manner, so that the top plate is fitted to the upper-side opening of the cylindrical casing, whereby a cylindrical space is formed between the cylindrical casing and the rotor and the flat cable is contained in the cylindrical space.

As mentioned above, the end portion of the flat cable just drawn out from the coiled reel is immediately fixed to the first connector. The flat cable can thus be wound directly around the barrel portion of the rotor as it is being unrolled from the reel coil. As a result, the step of temporarily spiraling the flat cable after having unrolled it from the coiled reel and before fixing it to the connector is no longer needed. The present invention can thus eliminate this process step, even though it was deemed unavoidable in the prior art.

Since the flat cable drawn from the flat cable reel has to be wound directly around the barrel portion of the rotor, the rotor is preferably also in the form of a reel. In this way, the wound flat cable is prevented from springing off the rotor's barrel portion. In the reel-shaped rotor, the top and bottom plates of the rotor (which thereby form flanges) may be designed such that the distance separating the two plates at least roughly corresponds to the width of the flat cable, such that the clearance between the plates is minimized. As a result, the flat cable can be rotated smoothly, and the rotary movement will thus produce little rubbing or vibration noise.

However, the present invention is not limited to a reel-shaped rotor. The rotor may have a cross-section in the form of T, for example. The bottom plate may then be mounted on the barrel portion of the rotor in a freely removable manner. In this structure, the flat cable just delivered from the coiled reel may be directly wound around the rotor's barrel portion, so as to form a cable reel. In such a configuration, the rotor's bottom plate is removed from the rotor's barrel portion before mounting the rotor into the cylindrical casing.

BRIEF DESCRIPTION OF THE DRAWINGS

The above and other objects, features and advantages of the present invention will be made apparent from the following description of the preferred embodiments, given as non-limiting examples, with reference to the accompanying drawings, in which.

DETAILED DESCRIPTION OF THE PREFERRED EMBODIMENTS

Figure 1:
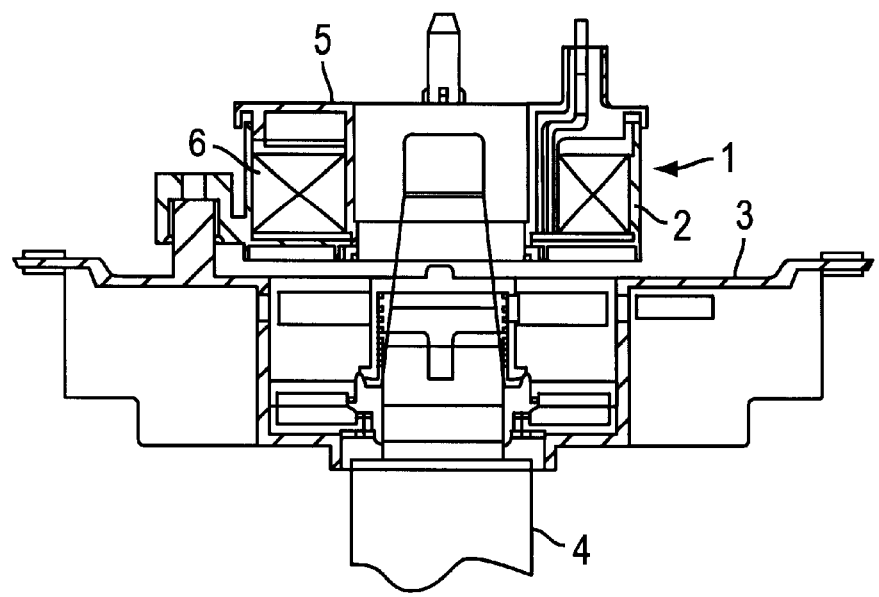
FIG. 1 is a cross-sectional view of a cable reel mounted on a steering wheel according to the prior art.
Figure 2:
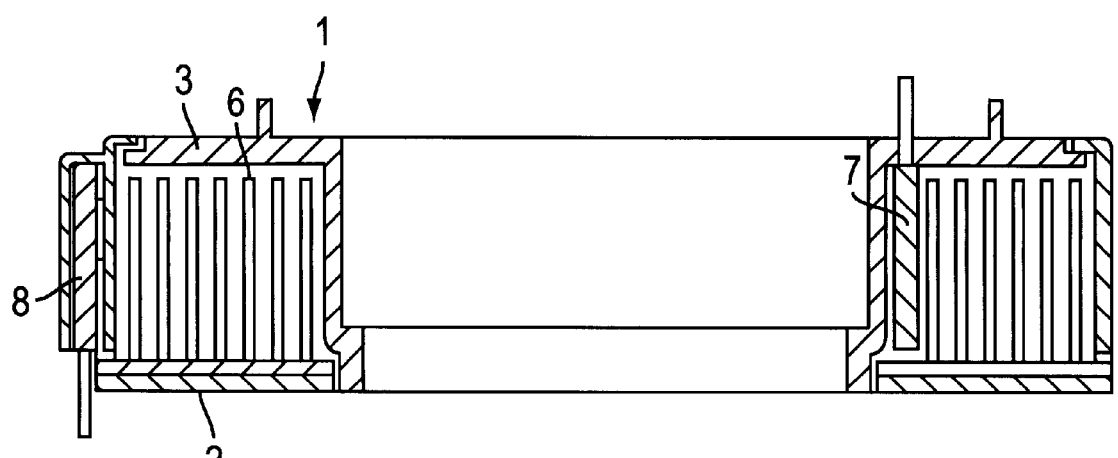
FIG. 2 is a schematic cross-sectional view of a cable according to the prior art.
Figure 3:
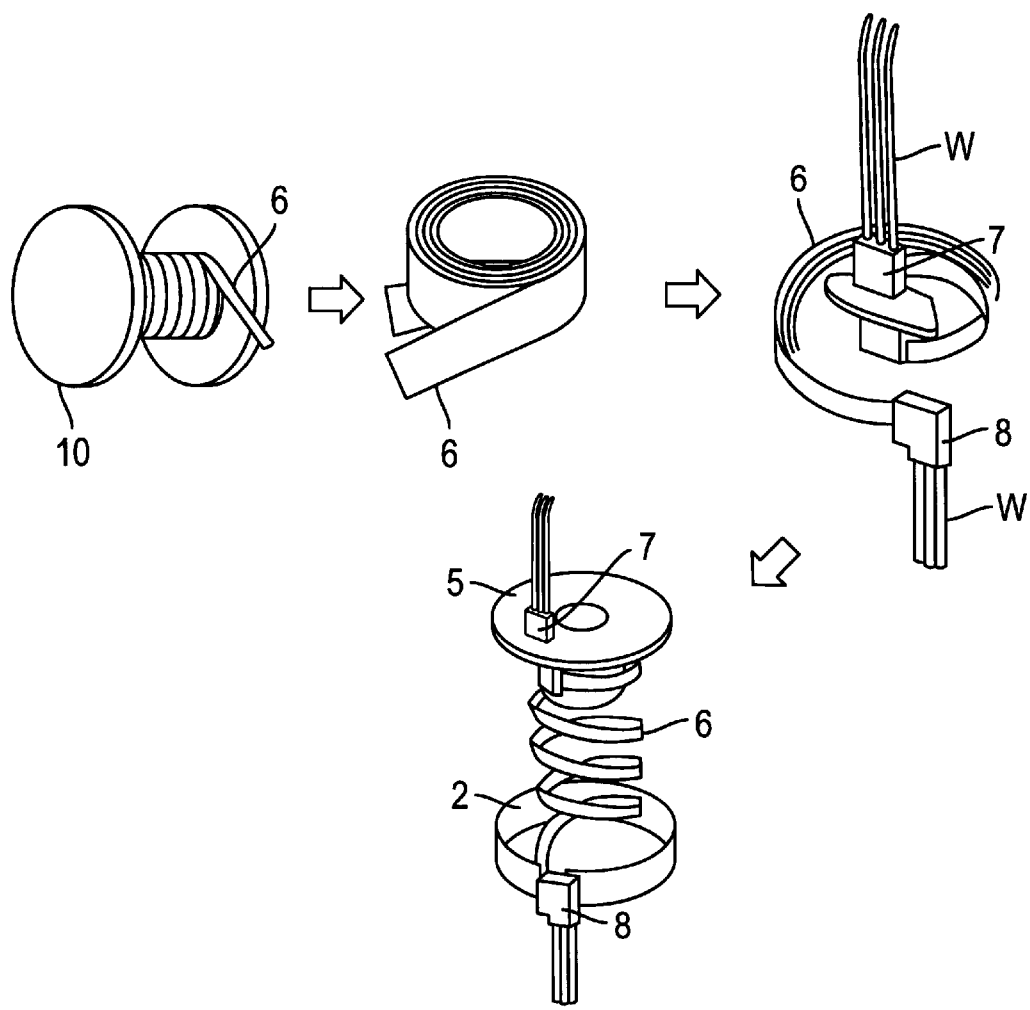
FIG. 3 shows the steps of assembling a cable reel known in the prior art.
Figure 4:
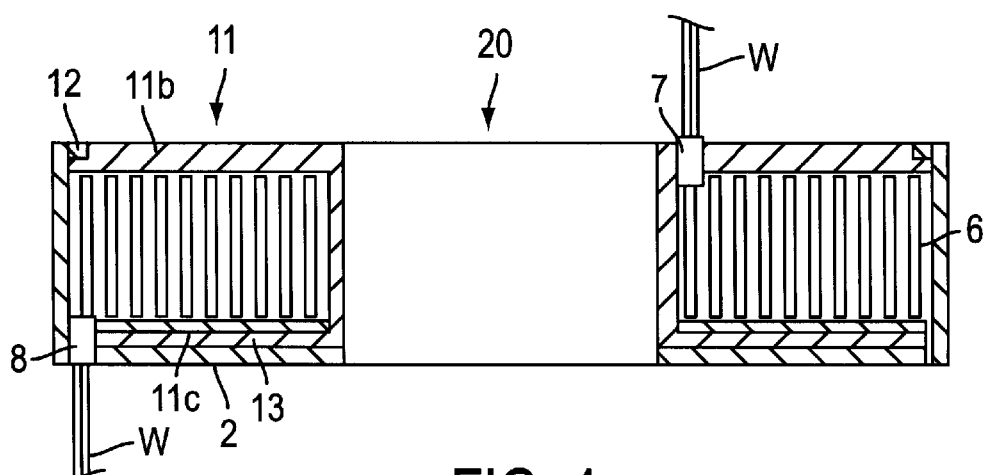
FIG. 4 is a schematic cross-sectional view of the cable according to a first embodiment of the invention.
Figure 5:
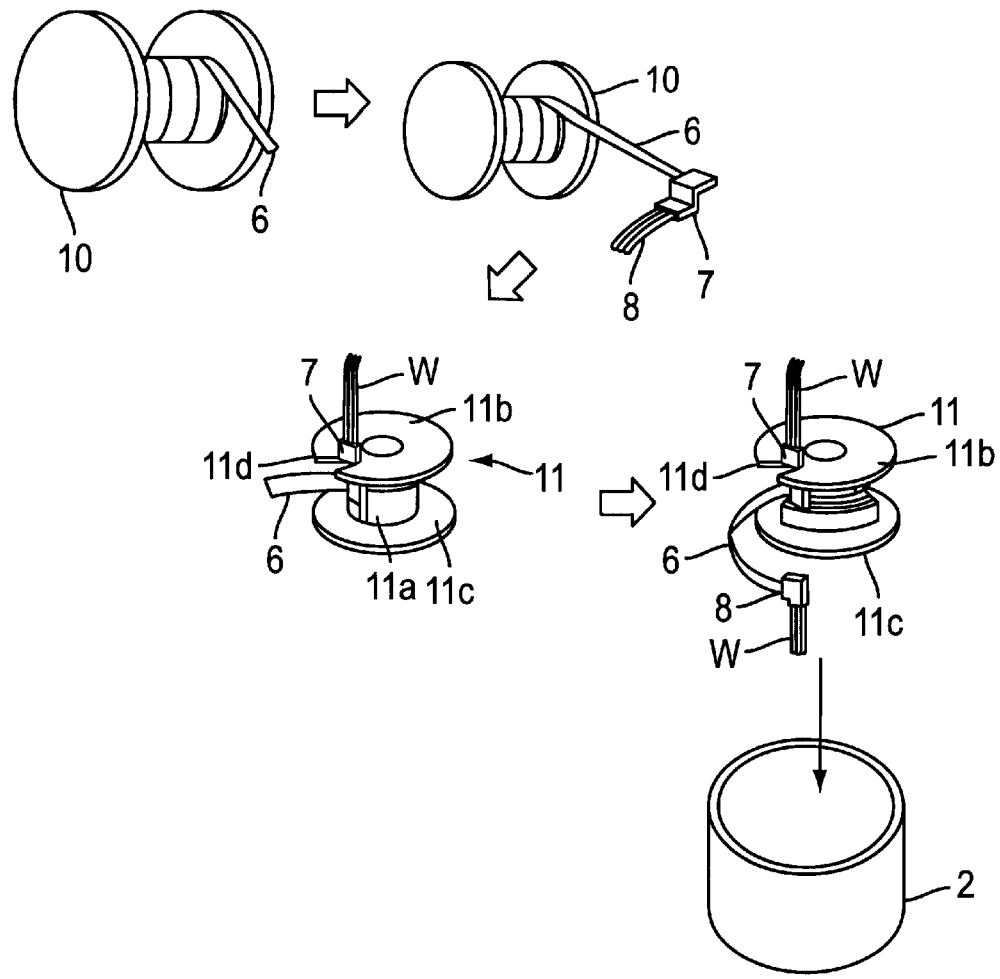
FIG. 5 shows the steps of assembling the cable reel of FIG. 4.

FIGS. 4 and 5 show a cable reel 20 according to a first embodiment of the present invention, in which a rotor 11 is in the form of a reel or spool. The cable reel 20 shown in FIG. 4 is assembled according to the assembling method illustrated in FIG. 5.

The rotor 11 includes a cylindrically shaped barrel portion 11a, a top plate 11b and a bottom plate 11c, each plate projecting diametrically from the barrel portion 11a to form a respective end flange. The length of the barrel portion 11a is set to be about the same as the width of the flat cable 6, such that when the flat cable 6 is wound around the barrel portion 11a, the clearance between the width of flat cable 6 and the top and bottom plates is kept to a minimum. Further, the top plate 11b is provided at its peripheral portion with a fixing notch 11d designed to receive and engage a connector 7.

As shown in FIG. 5, the end portion of flat cable 6 is unrolled from a coiled reel 10, and fitted with a first connector 7. The connector 7 can be fitted according to a method classically employed in the prior art. For instance, the copper strip forming the flat cable 6 is welded or soldered to the core portion of electrical cable w, and the welded part is fixedly held by a connector housing. Alternatively, the welded part may be subjected to a molding process to form a connector housing. Alternatively yet, the electrical cable w may be replaced by a bus bar.

After having been fixed to the end portion of flat cable 6, the first connector 7 is inserted into the fixing notch 11d cut out from the top plate 11b of rotor 11.

The flat cable 6 is then unrolled from the coiled reel 10 and, at the same time, wound around the barrel portion 11a of rotor 11, in the manner of a coiled hairspring.

While it is pulled out from the coiled reel 10, the flat cable 6 is immediately wound around the barrel portion 11a of rotor 11, and is cut off from the rest of the coiled flat cable when an appropriate length has been pulled out.

A second connector 8 is then fitted to the cut-off end of the unrolled flat cable 6. The second connector 8 is fixed in the same manner as the first connector 7.

As a result, the flat cable 6 is wound around the rotor 11, with the connectors 7 and 8 at its end portions. Further, the wound flat cable 6 is flanked by the top and bottom plates 11b and 11c with only a minimum clearance.

The rotor 11 with the flat cable 6 wound around it is then inserted into a cylindrical casing 2. Thereafter, the second connector 8, which is fixed to a second end portion (outer end portion) of wound flat cable 6, is fitted to a fixing portion (not shown in the figures) provided in the cylindrical casing 2. The electrical cable w joined to the second connector 8 is then led out from the assembly. Further, a sliding sheet 13 is initially adhered to the inner face of at least the bottom plate 11c of rotor 11. Thus, the edge of flat cable 6 facing the bottom plate 11c can slide over the sliding sheet 13. The rotor 11 is inserted into the cylindrical casing 2 through its end opening. A ring-shaped locking means 12 may then be fixed to the inner circular face of this upper opening. The rotor 11 is thus assembled into the cylindrical casing in a freely rotatable manner.

When the cable reel 20 is assembled as described above, the flat cable 6 is wound around the barrel portion 11 a of rotor 11 directly from the coiled reel 10, as the flat cable 6 is unrolled from the reel 10. By virtue of this manufacturing approach, the step of temporarily forming a loop is no longer required. Instead, only the step of winding the flat cable 6 around rotor's barrel portion 11a is needed. Hence, the manufacturing procedure is simplified.

Further, the cable reel 20 includes a rotor 11 in the form of a reel, and the flat cable 6 rotates between the top plate 11b and the bottom plate 11c of rotor 11. As the distance between top and bottom plates 11b and 11c, and the width of flat cable 6 is designed such as to keep a clearance only to a minimum, the flat cable 6 is able to stably rotate. As a result, frictional or vibration noises generated at the rotor 11 are considerably reduced.

However, the form of rotor 11 is not limited to that of the reel. As already described in the prior art, the rotor 11 may comprise only a barrel portion 11a and a top plate 11b, but not a bottom plate 11c.

Figure 6:
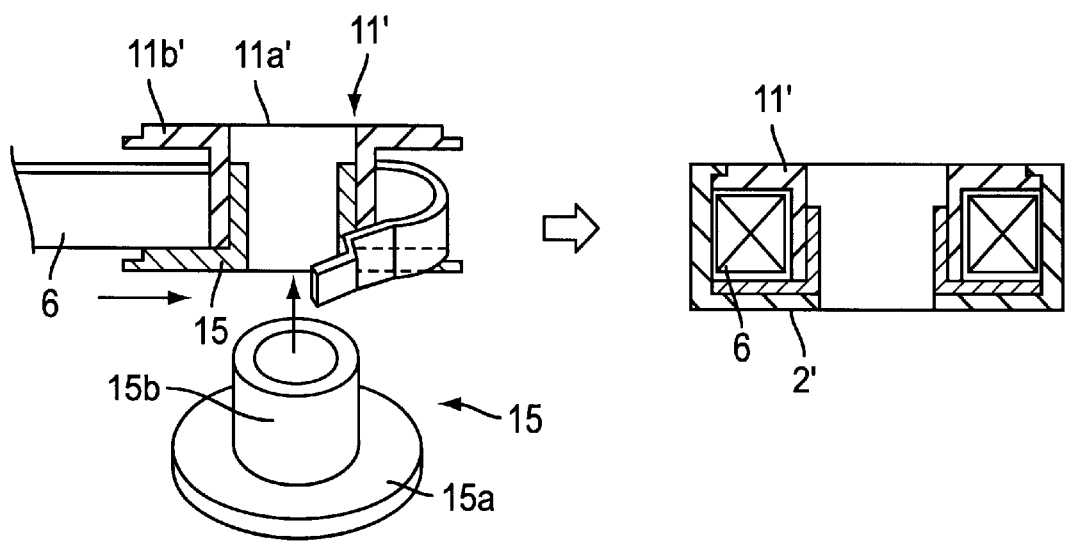
FIG. 6 shows the steps of assembling the cable reel according to a second embodiment of the invention.

In a second embodiment shown in FIG. 6, a rotor 11' may have a T-shaped cross-section, including a barrel portion 11a' and a top plate 11b'. There is then provided a fitting member 15 which includes a bottom flange 15a and a spigot portion 15b. When the flat cable 6 is unrolled from a coiled reel 10 and wound around the rotor 11', the spigot portion 15b of fitting member 15 is fitted into the rotor's barrel portion 11a' in a freely mountable-and-removable manner.

When the rotor 11' is to be mounted into a cylindrical casing 2', the fitting member 15 is removed from the rotor 11' beforehand. The rotor 11' is then fitted into the cylindrical casing 2' in a freely rotatable manner, as in the first embodiment.

According to the present invention, the flat cable is wound directly around the rotor's barrel portion as it is being unrolled from the coiled reel. The temporary looping step, used in the prior art, is thus eliminated. The elimination of this step enhances productivity and reduces costs.

Further, when the rotor is in the form of reel, the flat cable can be wound around the rotor's barrel portion. When the flat cable is rotated in this configuration, its movement is very stable. As a result, rubbing or rattling noises due to rotor's rotation can be reduced.

Although the invention has been described with reference to particular means, materials, and embodiments, it is to be understood that the invention is not limited to the particulars disclosed, and extends to all equivalents within the scope of the claims.

The present disclosure relates to subject-matter contained in priority Japanese Application No. HEI-10-207508, filed on Jul. 23, 1998, which is herein expressly incorporated by reference in its entirety.

What is claimed:

1. A cable reel in combination with a vehicle steering system, said vehicle steering system including a steering column and a steering wheel, said cable reel comprising:

a cylindrical casing mounted to one of the steering column and the steering wheel, and said casing having at least an end opening, a rotor mounted to the other of the steering column and the steering wheel, and said rotor being mounted into said cylindrical casing in a freely rotatable manner, thereby forming a cylindrical space between said cylindrical casing and said rotor, a flat cable having a first end portion and a second end portion, the first end portion being fixed to said rotor, and the second end portion being fixed to said cylindrical casing, and said rotor including a reel having a barrel portion with two ends, the two ends being provided with a top plate and a bottom plate, respectively, each of said top and bottom plates diametrically projecting from said barrel portion, said flat cable being wound around said barrel portion of said rotor and contained in said cylindrical space, and said top plate of said rotor being arranged such as to close said end opening of said cylindrical casing when said rotor is mounted into said cylindrical casing, whereby said flat cable remains within said cylindrical casing during any rotation of said rotor.

2. A cable reel according to claim 1, wherein said top plate includes a fixing notch and said flat cable includes a connector at a first end portion, said connector being fitted into said fixing notch.

3. A method of assembling the cable reel of claim 1, said method comprising:

a) unrolling said flat cable from a coiled reel;

b) fixing a first connector to a first end portion of said flat cable;

c) preparing said rotor having said barrel portion, and providing said top plate with a fixing notch;

d) fitting said first connector into said fixing notch so that said first end portion of said flat cable is fixed to said rotor;

e) winding said flat cable around said barrel portion of said rotor up to a predetermined length as said flat cable is being unrolled from said coiled reel;

f) cutting off said flat cable, so as to form a second end portion;

g) fixing a second connector to said second end portion;

h) mounting said rotor wound with said flat cable into said cylindrical casing in a freely rotatable manner and;

i) fixing said second connector to said cylindrical casing so that said second end portion of said flat cable is fixed to said cylindrical casing.

4. A method of assembling a cable reel in combination with a vehicle steering system, said vehicle steering system including a steering column and a steering wheel, said cable reel comprising:

a cylindrical casing mounted to one of the steering column and the steering wheel, and said casing having at least an end opening;

a rotor mounted to the other of the steering column and the steering wheel, and said rotor including a barrel portion, and a top plate diametrically projecting from said barrel portion, thereby substantially forming a T-shaped cross-section, said top plate being adapted for insertion into said end opening; and a flat cable wound around said barrel portion;

said method comprising:

a) unrolling said flat cable from a coiled reel, said flat cable having a first end portion;

b) fixing a first connector to said first end portion of said flat cable;

c) preparing said rotor having said barrel portion, and providing said top plate with a fixing notch;

d) fitting said first connector into said fixing notch so that said first end portion of said flat cable is fixed to said rotor;

e) winding said flat cable around said barrel portion of said rotor up to a predetermined length as said flat cable is being unrolled from said coiled reel;

f) cutting off said flat cable, so as to form a second end portion; and g) fixing a second connector to said second end portion;

h) mounting said rotor wound with said flat cable into said cylindrical casing in a freely rotatable manner, so that said top plate is fitted to said end opening of said cylindrical casing; and i) fixing said second connector to said cylindrical casing so that said second end portion of said flat cable is fixed to said cylindrical casing;

whereby a cylindrical space is formed between said cylindrical casing and said rotor, and said flat cable remains within said cylindrical space during any rotation of said rotor.

* * * * *